(12) United States Patent
Oran

(10) Patent No.: US 6,636,594 B1
(45) Date of Patent: *Oct. 21, 2003

(54) DIAL PLAN MAPPER

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 09/885,228

(22) Filed: Jun. 19, 2001

Related U.S. Application Data (63) Continuation of application No. 09/219,182, filed on Dec. 22, 1998, now Pat. No. 6,275,574.

(51) Int. Cl.[7] .................................................. H04M 3/42
(52) U.S. Cl. .............................. 379/201.01; 379/93.07; 370/352; 370/401
(58) Field of Search .......................... 379/201.01, 93.07, 379/90.01, 202.01; 370/259, 352, 355, 356, 401

(56) References Cited

U.S. PATENT DOCUMENTS

| | | | | |
|---|---|---|---|---|
| 5,867,494 A | * | 2/1999 | Krishnaswamy et al. ... | 370/352 |
| 5,999,525 A | * | 12/1999 | Krishnaswamy et al. ... | 370/389 X |
| 6,061,347 A | * | 5/2000 | Hollatz et al. .......... | 379/265 X |
| 6,128,304 A | * | 10/2000 | Gardell et al. .......... | 370/352 X |
| 6,141,341 A | * | 10/2000 | Jones et al. ................. | 370/352 |
| 6,196,846 B1 | * | 3/2001 | Berger et al. ............... | 434/118 |

* cited by examiner

*Primary Examiner*—Creighton Smith
(74) *Attorney, Agent, or Firm*—Marger Johnson & McCollom, PC

(57) ABSTRACT

A dial string is received from a session application that interfaces with a packet-based or circuit-switched system such as VoIP, PSTN, PBX, etc. Regular expression match patterns are compared with the input dial string. The dial plan mapper identifies one of the match patterns providing a longest match with the dial string and outputs call configuration information associated with the identified match pattern. The configuration information contains call parameters necessary for establishing the telephone call with the call destination. The configuration information format allows the dial plan mapper to specify any one of the wide variety of different session protocols that may be associated with a particular call destination.

36 Claims, 10 Drawing Sheets

| Input or Output | Description |
|---|---|
| Dialstring | A string of dial tokens - also used to represent stored phone numbers, such as the calling line |
| matched | Tells how many of the digits in the dialed number were used to match the destination phone number |
| Session Protocol | A signaling protocol to use, e.g. H.323, SIP |
| Session Target | A string describing the target for the call |
| QoS | A way to specify what quality of service to request and accept for the call |
| Result | An indication of whether the mapping succeeded, failed, or needs more input |
| Output Dialstring | The processed dialstring, with possibly prepended or appended digits |

I/O FOR DIAL PLAN MAPPER

FIG.6

| Field | Description |
|---|---|
| Match Pattern | A generalized regular expression (see below) |
| Session Protocol | Name of session protocol to use for calls matching this entry |
| Session Target | A string specifying either the host which is the destination of the call, or something which can be used to obtain same. The string can contain a substitution specification so that portions of the dial string may be inserted to form the final session target specifier. There are a number of different forms for the session target string, which are enumerated later on in this specification. |
| QoS to Request | Quality of Service to request on calls to this destination. One of: BestEffort, ControlledLoad, GuaranteedDelay. |
| QoS to Accept | Minimal Quality of Service to accept on calls to this destination. One of: BestEffort, ControlledLoad, GuaranteedDelay. Must be lower or equal to the QoS to request. |
| Prepend and Append digits | Digits to prepend and/or append to the processed dialed number if this entry is matched |
| Security information | Variables indicating whether to accept or reject this call, and whether to suppress or transmit the calling party information to the receiving host. |

FIG.7

| Plan Element | Regular Expression | Description |
|---|---|---|
| XXXX | [1-7][0-9]\{3\} | Matches a four digit extension, which can't start with 0, 9 or 8 |
| 9-<local POTS number> or 8-<long distance POTS number> | [89] | Matches a "9" as the initial digit. The rest of the POTS number has to be handled by the session protocol. Note that this syntax works because the dial plan mapper must be called as each digit is accumulated and not just when convenient. |
| 0 | 0 | Matches a "0" as the initial digit |

FIG.8

| Null | No session protocol is involved. Either the packet voice can be sent back directly to a local telephony interface, or an RTP stream can be set up immediately to the matching destination. |
|---|---|
| H.323 | ITU Videoconferencing Protocols - Session Target points to H.323 Endpoint |
| H.323Gatekeeper | ITU Videoconferencing Protocols - Session Target points to H.323 Gatekeeper |
| SIP | Internet Simple Conference Invitation Protocol |
| SAP | Internet Session Announcement Protocol |

FIG.9

| Example | Meaning |
|---|---|
| local:2 | The session target is voice interface 2 on the local machine |
| ipv4:[171.68.13.55]:1006 | The session target is the IP version 4 address of 171.68.13.55 and port 1006 |
| dns:pots.cisco.com:1661 | The session target is the IP host with dns name pots.cisco.com, and port 1661 |
| dialstring:1919444$u$ | Replace the input dialstring with the string to the right of the colon and recursively perform the lookup. |
| dial_plan_service://cisco/HOST, PORT/CALLER=$s$, CALLEE=$d$ | The session target is obtained by using the service location protocol, asking for the dial_plan_service for cisco to find the right IP HOST and PORT to handle the call from the local phone $s$ dialing the dialstring $d$. This example shows the string substitution capability in the syntax. |

FIG.10

| Session Protocol | Meaning of a null Session Target |
|---|---|
| H.323 | Treat as if localhost: had been specified with the well known port for the H.323 listener |
| H.323Gatekeeper | Use RAS discovery to locate the Gatekeeper |

FIG.11

DIAL PLAN MAPPER

This application is a continuation of prior application Ser. No. 09/219,182, filed Dec. 22, 1998 now U.S. Pat. No. 6,275,574.

BACKGROUND OF THE INVENTION

This invention relates to telephone systems and more particularly to a dial plan mapper used for routing telephone calls to different telephone networks.

In order to provide adequate utility, a Voice over IP (VoIP)-based Internet Telephony system must provide connectivity to the hundreds of millions of telephones on today's Public Switched Telephone Network (PSTN). Circuit-switched telephony is based on the E.164 international addressing standard. Internet applications are based on the Internet Protocol (IP) address space and the Domain Name System (DNS). In order to provide telephony services over IP networks (VoIP), there must be a translation between E.164 addresses and Internet hosts.

There are many challenges to interconnecting these large systems, not the least of which is the different addressing schemes and signaling protocols used by the two systems. The E.164 addressing scheme used with PSTN comprises a string of 1–15 decimal digits with allocation by country and geographic area. VoIP on the other hand uses 32 bit IP addresses that are assigned to Internet hosts. The PSTN signaling protocol uses a Foreign Exchange Office (FXO), Foreign Exchange Station (FXS), or Ear and Mouth (E&M) for analog signaling and Q.931, Q.Sig or Common Channel Signaling System #7 (SS7) for digital signaling. VoIP uses H.323, Session Initiation Protocol & Session Description Protocol (SIP+SDP), Simple Gateway Control Protocol (SGCP), Media Gateway Control Protocol (MGCP) and many other types of signaling protocols.

Quality of Service (QoS) for PSTN and VoIP are also different. QoS for PSTN is based on one universal level with 300–3400 Hz voice channels, sampled at 8 kHz, and transmitted digitally as 64 kbps Pulse Code Modulation (PCM). QoS for VoIP varies from "best effort" to "guaranteed delay" and uses protocols such as Resource Reservation Protocol (RSVP) and packet scheduling algorithms such as Weighted Fair Queuing (WFQ).

Prior efforts to marry these two address spaces have attempted to embed one address space in the other. For example, host names are provided in the form 2048.264.508.1.pstn.net. Alternatively, every endpoint is required to have two addresses. None of these efforts have proven effective. Furthermore, these mapping schemes do not operate efficiently with locally administered short-cut dial plans, such as those used with a Private Branch Exchange (PBX).

Thus, a need remains for a single translation solution for efficiently mapping between different VOIP and circuit-switched telephone systems.

SUMMARY OF THE INVENTION

Circuit-switched telephony is based on the E.164 international addressing standard. Internet applications are based on the IP address space and the Domain Name System (DNS). In order to provide telephony services over IP networks (known as Voice over IP, or VoIP), a dial plan mapper manages the translation between E.164 addresses and Internet hosts. The dial plan mapper at the same time translates between the variety of addressing (e.g. private dialplan), session protocol, and quality of service mechanisms present in today's IP and circuit-switched network environments.

A dial string is received from a session application that interfaces with a packet switched or circuit-switched system such as VoIP, PSTN, PBX, etc. Regular expression match patterns are compared with the dial string. The dial plan mapper identifies one of the match patterns providing a longest match with the dial string and outputs call configuration information associated with the identified match pattern. The configuration information contains call parameters necessary for completing the telephone call whatever session protocol is associated with the call destination. The configuration information indicates what destination system the session application needs to talk to for establishing the call, what protocol to use for talking with the destination system and how to manipulate the input dial string to construct an output dial string usable by the destination system.

The dial plan mapper allows normal circuit-switched telephones to be used with VoIP and allows existing dialing conventions to be used unchanged. As far as the dial plan mapper is concerned, there is no difference between a call originated locally on a phone connected to a host containing the dial plan mapper and a call originated through a PBX or PSTN switch connected to the host via either analog or digital trunks. When calls arrive over the IP network, the dial plan mapper maps from the destination telephone number provided in the session protocol (usually an E.164 number) to the proper local interface (local FXS line or outbound trunk) for completing the call over the legacy voice network.

The mapping scheme accommodates the styles of phone numbers in use internationally, through the PSTN and through internal private voice networks. For example, full E.164 international numbers like +1 44 736 5534, national numbers like 1 900 746-6379, local numbers like 435 8251, internal company dialing schemes like 6-2231, with outside-line escapes such as 8- and 9-. These different numbering schemes are dealt with in the same way, rather than through a set of ad hoc rules as generally applied in other systems.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
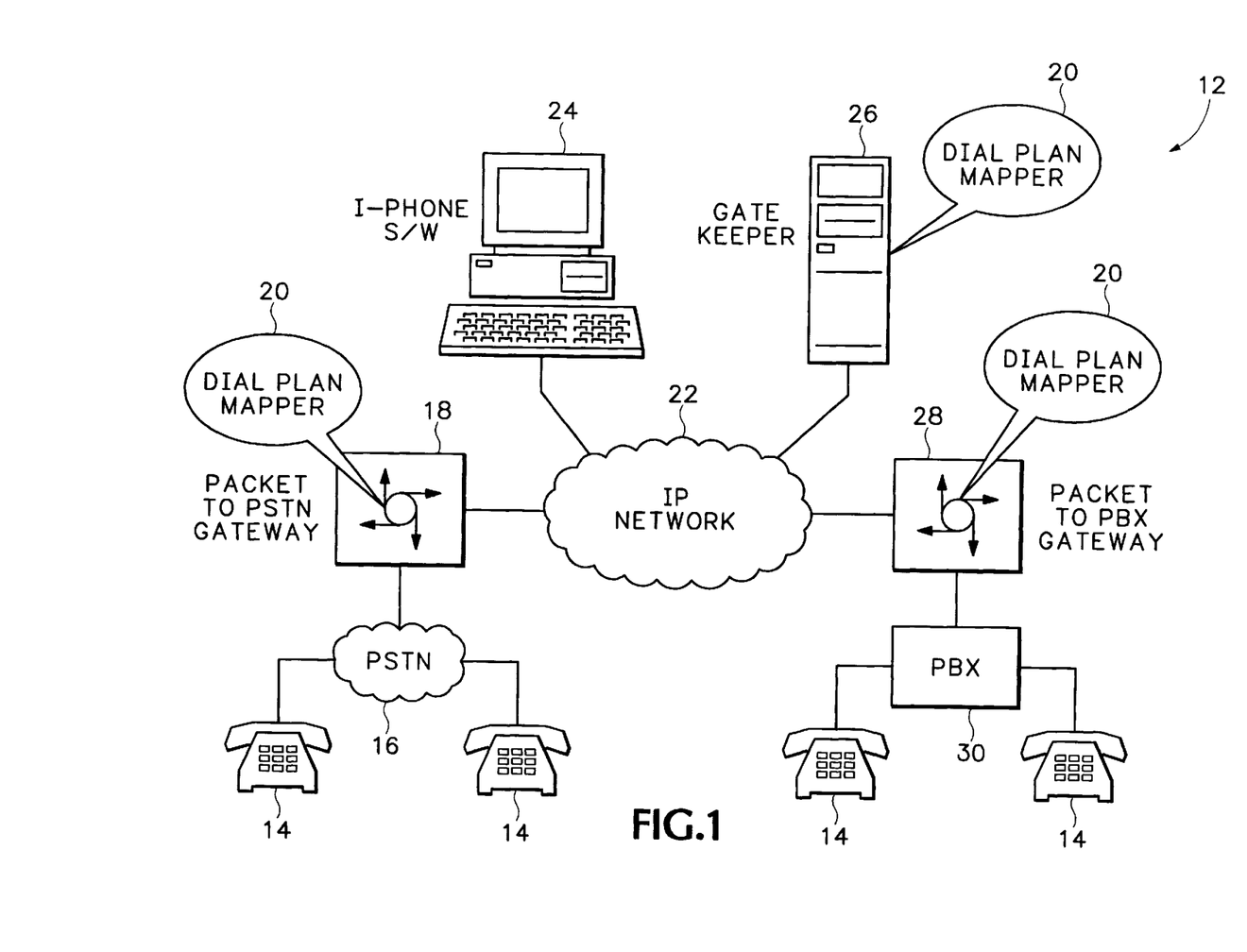
FIG. 1 is a diagram of a telephone system including dial plan mappers according to the invention.

FIG. 1 is a diagram of a telephone system 12 that includes multiple telephone handsets 14 connected to the PSTN 16 or a PBX 30. An Internet Protocol phone (I-Phone) 24 IP uses a gate keeper 26 to direct telephone calls over an IP network 22. A packet to PSTN gateway 18 is used for transferring calls between the PSTN 16 and the IP network 22. A packet to PBX gateway 28 is used in for transferring calls between the PBX 30 and the IP network 22. A dial plan mapper 20 according to the invention is located in one or more of the different gateways 18 and 28 and gatekeeper(s) 26 to efficiently route calls between different destinations for phones 14 and 24.

The dial plan mapper 20 can be integrated into a variety of existing IP hosts such VoIP routers, Voice over Frame Relay (VOFR) routers, and H.320/H.323 gateways. Other types of telephony systems connected to the IP network 22 may also use the dial plan mapper 20 and also come within the scope of this invention. The dial plan mapper provides more flexible and configurable address processing and translation capability than existing products.

Figure 2A:
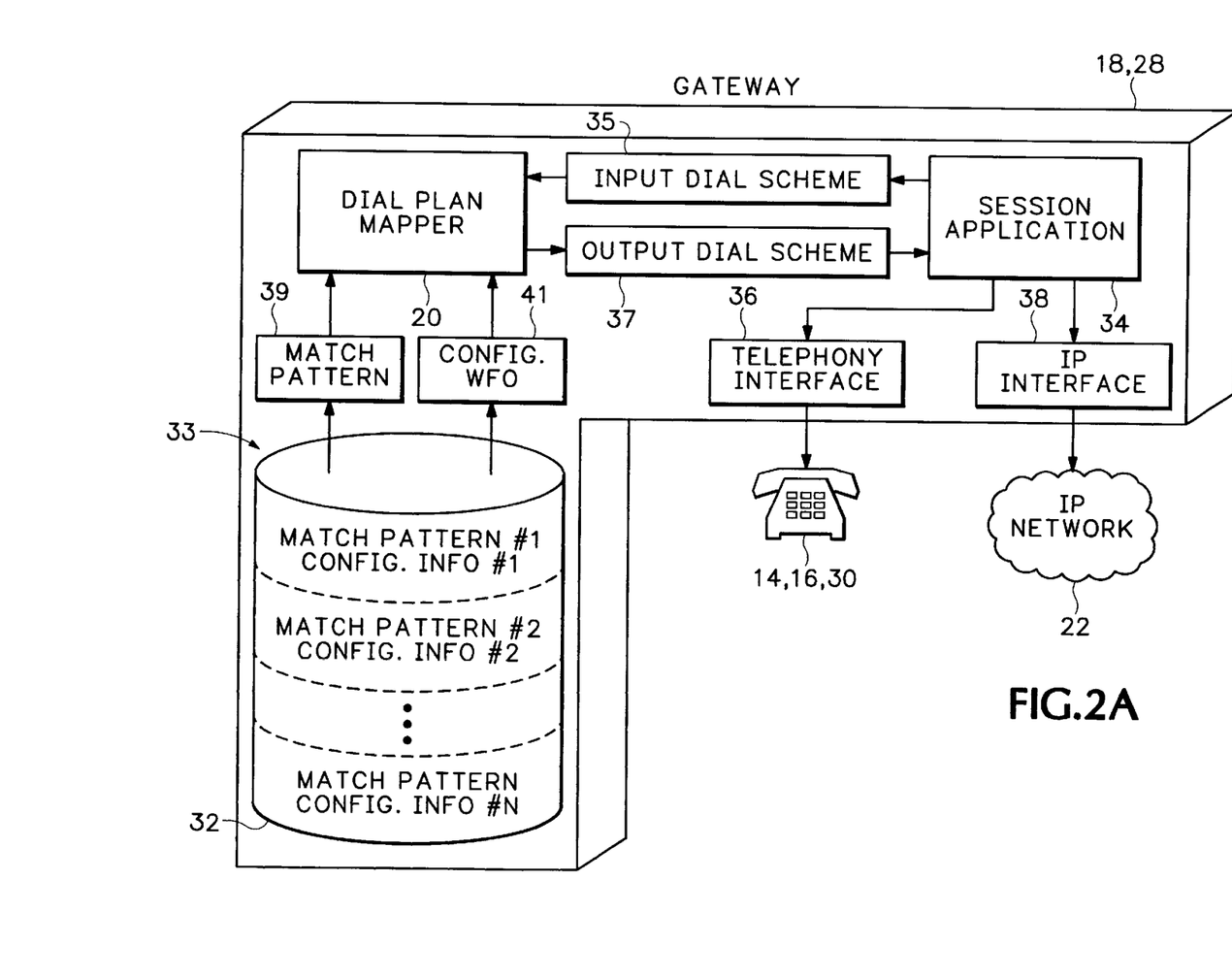
FIGS. 2A and 2B are detailed diagrams of the dial plan mappers shown in FIG. 1.

FIG. 2A is a detailed diagram of one of the gateways 18 or 28 in the telephone system shown in FIG. 1. The gateways 18 and 28 include a session application 34 that responds to telephone calls. For example, session applications may comprise an integrated voice response system or a phone call routing system. These session applications are generally well known and therefore, not described in further detail.

Telephones 14 are coupled either directly or through a PSTN 16, PBX 30, etc. telephony interface 36 to the session application 34. The telephony interface 36 consists of whatever circuitry abstracts the signaling part of the telephony hardware attached to the gateway. The IP network 22 is coupled through an IP interface 38 to the session application 34. The session application 34 provides call translation required between the telephone interface 36 and the IP interface 38.

Figure 2B:
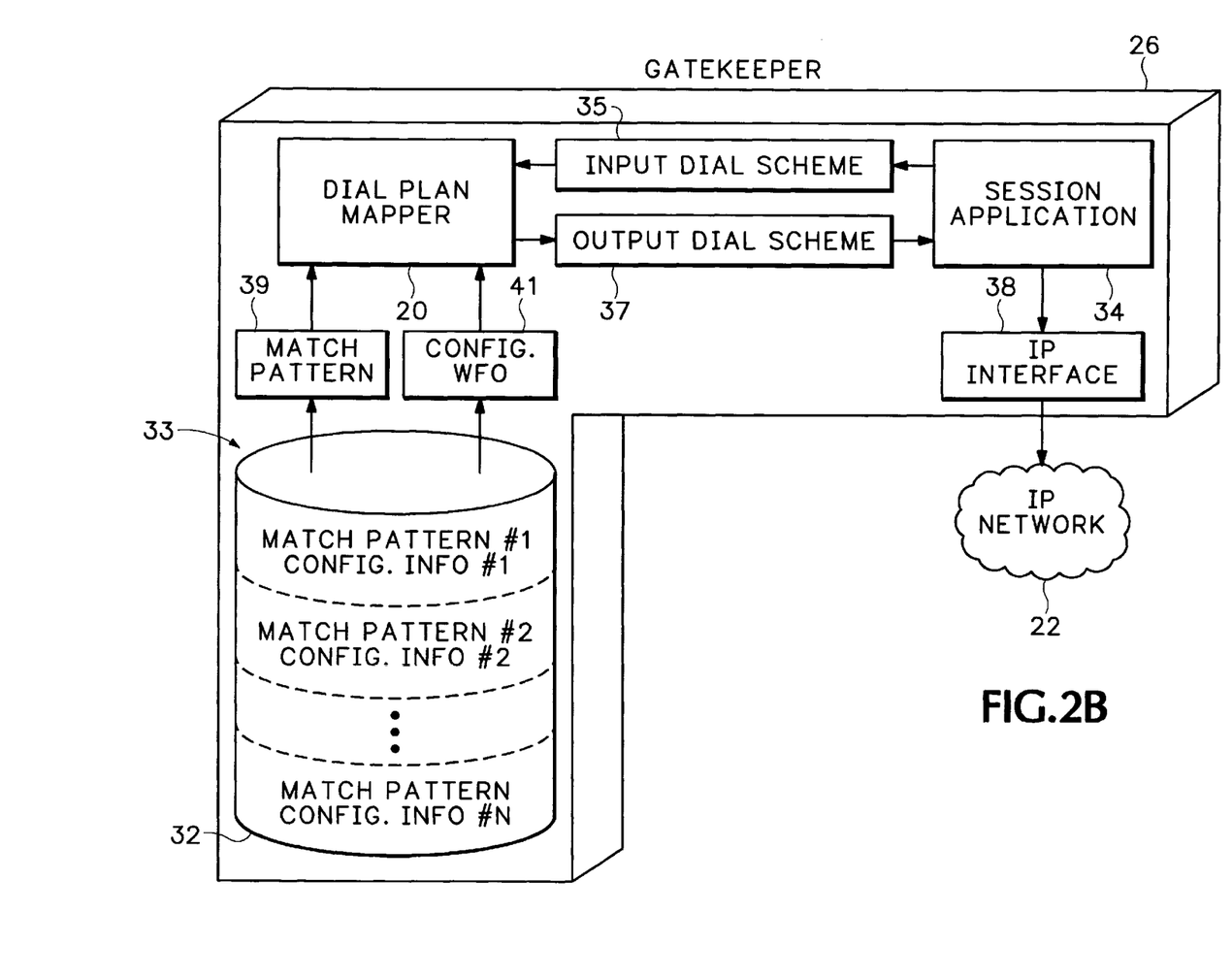

FIG. 2B shows a detailed diagram of the gatekeeper 26 in FIG. 1. There is no telephony interface in the gatekeeper 26. Gatekeeper 26 processes gatekeeper routed signaling by sending received calls back out over the IP network 22 or passing the translated signaling from the dial plan mapper 20 back to the source IP phone 24 (FIG. 1) or gateway making the call.

Referring to FIGS. 2A or 2B, the dial plan mapper 20 in the gateways 18 or 28 or gatekeeper 26 includes a database 32 storing configuration entries 33 that include regular expression match patterns and associated configuration information. Examples of the regular expression match patterns are shown below in FIG. 8. Examples of the associated configuration information is described in further detail below and shown in FIG. 7.

The dial plan mapper 20 receives an input dial scheme 35 from the session application 34 that includes an input dial string. The regular expression match patterns in database 32 are compared with the input dial string. The match pattern 39 that matches the longest string of digits in the input dial string is identified. The configuration information 41 associated with the longest identified match pattern 39 is used by the dial plan mapper 20 to generate an output dial scheme 37 that is sent back to the session application 34.

One of the novel aspects of the invention is the regular expression matching preformed by the dial plan mapper 20 to identify the longest match pattern in the database. Another novel aspect of the invention comprises the configuration information 41 associated with the identified match pattern and how the configuration information is used to produce the output dial scheme 37 that can connect calls to a variety of different call destinations.

The use of the dial plan mapper 20 by the session application 34 is slightly different depending on whether the session application 34 is processing a call coming in through the local telephony interface 36 or a call arriving through IP interface 38.

Figure 3:
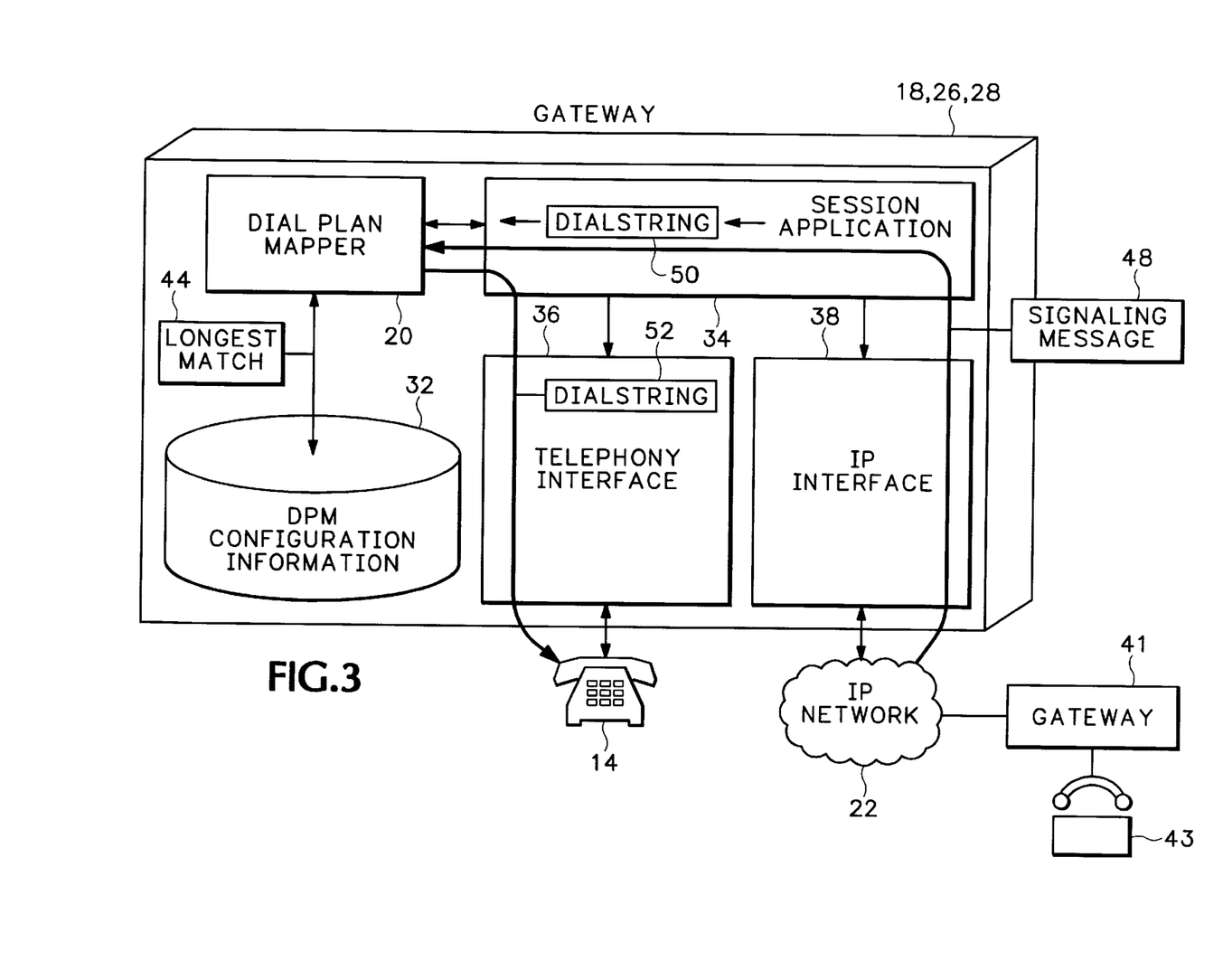
FIG. 3 shows how the dial plan mapper in FIG. 2A operates for calls coming in through an IP interface.

FIG. 3 shows how the dial plan mapper 20 operates for calls coming in through the IP interface 38. The VoIP session application 34 receives an incoming signaling message 48 sent over the IP network 22 using a session protocol. The session application 34 determines from the signaling message 48 a dial string 50 to use, and the calling dial string (if present) from the session protocol. The session application 34 may prepend a "+" to the dial string 50 if the session protocol uses full E.164 numbers.

Several conditions can exist when the dial string 50 is presented to the dial plan mapper 20. First, the dial plan mapper 20 might not find a match. This means either that the session protocol reached the wrong host, or the local dial plan mapper 20 is configured incorrectly. Alternatively, the session protocol might specify a target on a local interface, such as telephony interface 32. The session application 34 would then initiate dialing on telephony interface 36 using an output dial string 52 and configuration information returned from the dial plan mapper 20. The session protocol could also specify a target 43 on a remote interface 41. In this case, the session application 34 creates a tandem call back across the IP network 22.

For calls processed locally, the session application 34 uses the target information to select the proper local telephony interface 36 for making the outgoing call. Note that the syntax allows for trunk groups. The session application 34 constructs the appropriate dial string 52 using the configuration information associated with the longest match pattern in database 32. The dial plan mapper 20 includes in the dial string any locally-configured dialing prefix information for that interface 36. The session application 34 then dials the call to target 14.

Figure 4:
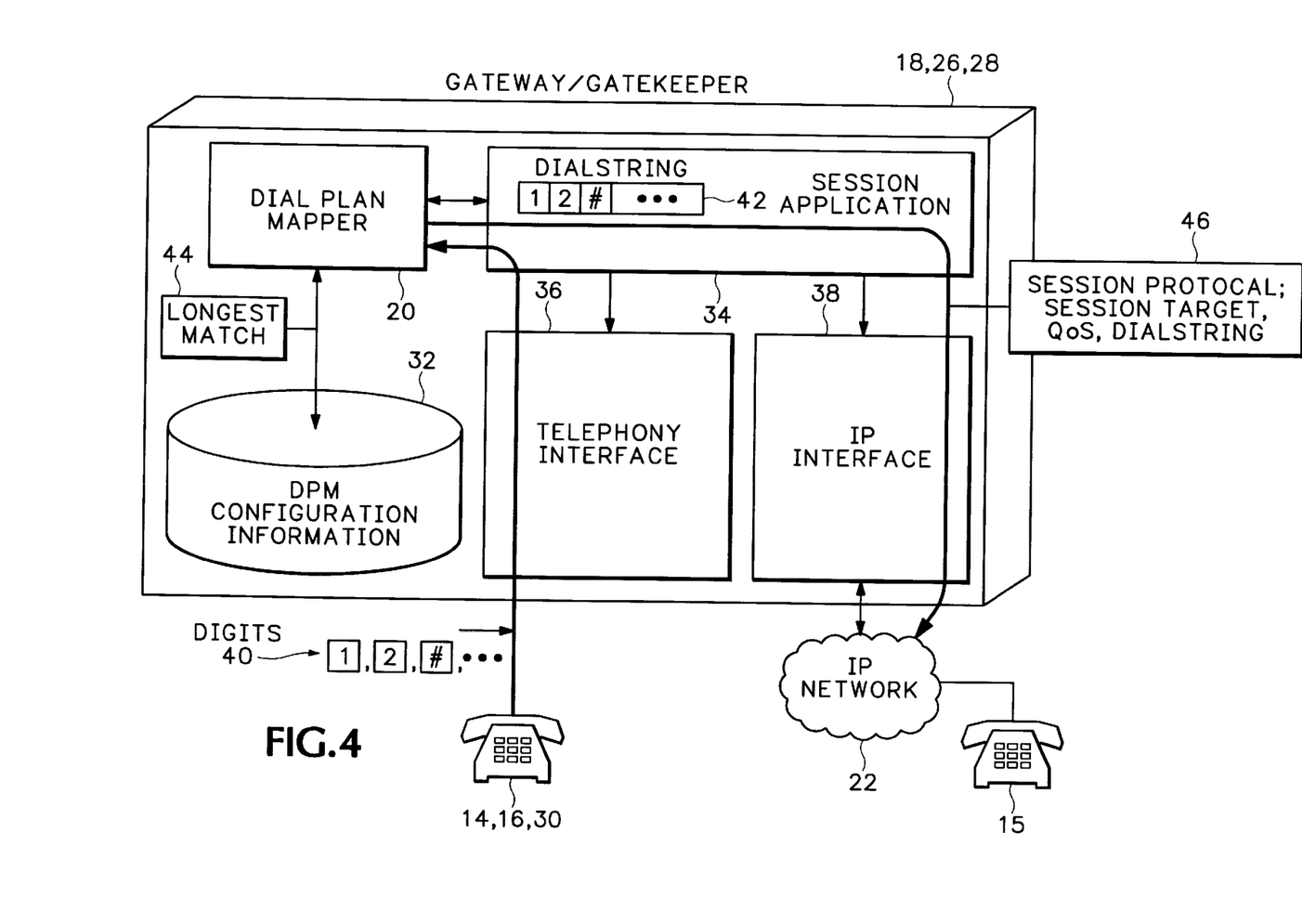
FIG. 4 shows how the dial plan mapper in FIG. 2A operates for calls coming in through a telephone or local telephony interface.

FIG. 4 shows a call coming through a local telephone 14 or a telephony interface such as an FXS, FXO, PBX trunk, etc. The session application 34 begins listening for a dial string when informed of a telephone off-hook condition by a telephony driver in telephony interface 36. For the telephone 14, the session application 34 sets a timer (not shown) to detect a timeout condition that might signal when the user has finished entering a dial string. The timer is reset each time a digit 40 is received from phone 14. Each time a digit 40 arrives, it is appended to an accumulated dial string 42, and the dial plan mapper 20 is called and supplied with the accumulated dial string 42. This process repeats until the dial plan mapper 20 returns either with a match or an indication that the dialed string cannot possibly match an entry, no matter how many more digits are dialed.

The dial plan mapper queries the configuration database 32 for the longest match 44. The match pattern 44 with the longest match is used as an index to identify associated configuration information 46. The session application 34 uses the returned session protocol, and session target from the configuration information 46 to initiate a session with a destination for the presented dial string 42, such as phone 15 on IP network 22.

The dial plan mapper 20 uses the matching digits in the dial string 42 to determine if some of the digits 40 in the input dial string 42 need to be presented to the target 15 via the session protocol. If so, the dial plan mapper 20 determines what suffix of the dial string 42 to use, and what digits might need to be prepended or appended.

For example, take the case of using H.323 as the session protocol. H.323 requires that a full E.164 address be passed in the Q.931-based signaling protocol. The proper E.164 address is obtained from the information returned by the dial plan mapper 20. The dial plan mapper 20 first determines the unmatched digits of the dial string 42 by removing matched digits from the original dial string 42. The unmatched digits are called unmatched. The unmatched digits are removed from the input dial string 42 and appended to the calling line number. The appended calling line number is used as the E.164 number to be dialed.

This allows very simple dial plans to be used in relatively sophisticated ways, since users are accustomed to dial more or fewer digits based on the relationship of their own number to the number being dialed.

Small Dial Plan Map

The dial plan mapper 20 can be used by a small but possibly multi-location business with a single central PBX. For example, a four digit extension (not beginning with 0, 9 or 8) goes to the phone with that extension. Whether a PBX phone or a VoIP phone, any digit string beginning with 9 or 8 goes to the PBX for outbound completion. The digit "9" gets a local trunk, the digit "8" gets a long-distance trunk. A bare digit 0 goes to the PBX operator station and anything else generates an error.

Medium/Large Dial Plan Map

The dial plan mapping scheme can also be used by a medium/large company with multiple PBXs not requiring sophisticated call optimization or multi-national internal/external dialing. For example the digit "6", followed by a four digit extension, goes to a phone of that extension connected to the PBX at site A. The digit "2", followed by a four digit extension, goes to a phone of that extension connected to the PBX at site B. The digit "7", followed by a four digit extension, goes to a phone on the internal VoIP network. This allows an existing dial plan to be extended for new VoIP-based remote or home offices.

Any digit string beginning with a "9" goes to the "best" PBX for reaching that PSTN number. The "best" PBX is determined as the PBX for site A when the area code is 408, and determined as the PBX at site B when the area code is 919. Otherwise, if the calling extension begins with the digit "6" the PBX for site A is used. If the call extension begins with the digit "2" the PBX at site B is used. If the call extension begins with the digit "7", either PBX is used. A bare digit "0" goes to the PBX operator station for the "default" PBX and anything else generates an error.

Complex Dial Plan Map

A complex plan used for a large multi-national company can also be supported by the dial plan mapper. All internal phone numbers could be assigned 7-digit "local" dialing numbers (3-digit "exchange"; 4-digit extension). Exchanges beginning with 1 or 4 are disallowed. A digit "6", followed by a four digit extension, goes to a phone whose first three digits are the same as the calling phone's, followed by the four digit extension. The digit "4", followed by a four digit "service" gets the appropriate instance of that service for the calling phone. This could be used for voice mail, e.g. 4-7000, or line ring back 4-1xxx, etc. The digit "8", followed by a 7-digit number, goes to the PBX handling that 3-digit exchange. The digits "81", followed by an E.163/E.164 number, gets mapped to the "best" PBX to reach that external number, using international internal trunks where possible and legal.

Internet Multicast

The dial plan mapper can also be used with Internet Multicast (MBONE) conferencing in a variety of ways. In a first example, the VoIP application listens to Session Announcement Protocol (SAP) announcements, which contain a telephone number as one of the fields. If the user picks up the phone and dials, for example, *2 followed by the phone number in a Session Description Protocol (SDP) announcement, the dial plan mapper 20 tells the session application to use the SDP session protocol. If an SDP announcement is received with an associated telephone number equal to the requested number, the caller gets hooked up to the audio portion of the conference.

The session application can also process Session Invitation Protocol (SIP)invitations, and if the invited user is reachable from one of the local telephony interfaces, the user is called and an attempt is made to connect him to the conference.

Figure 5:
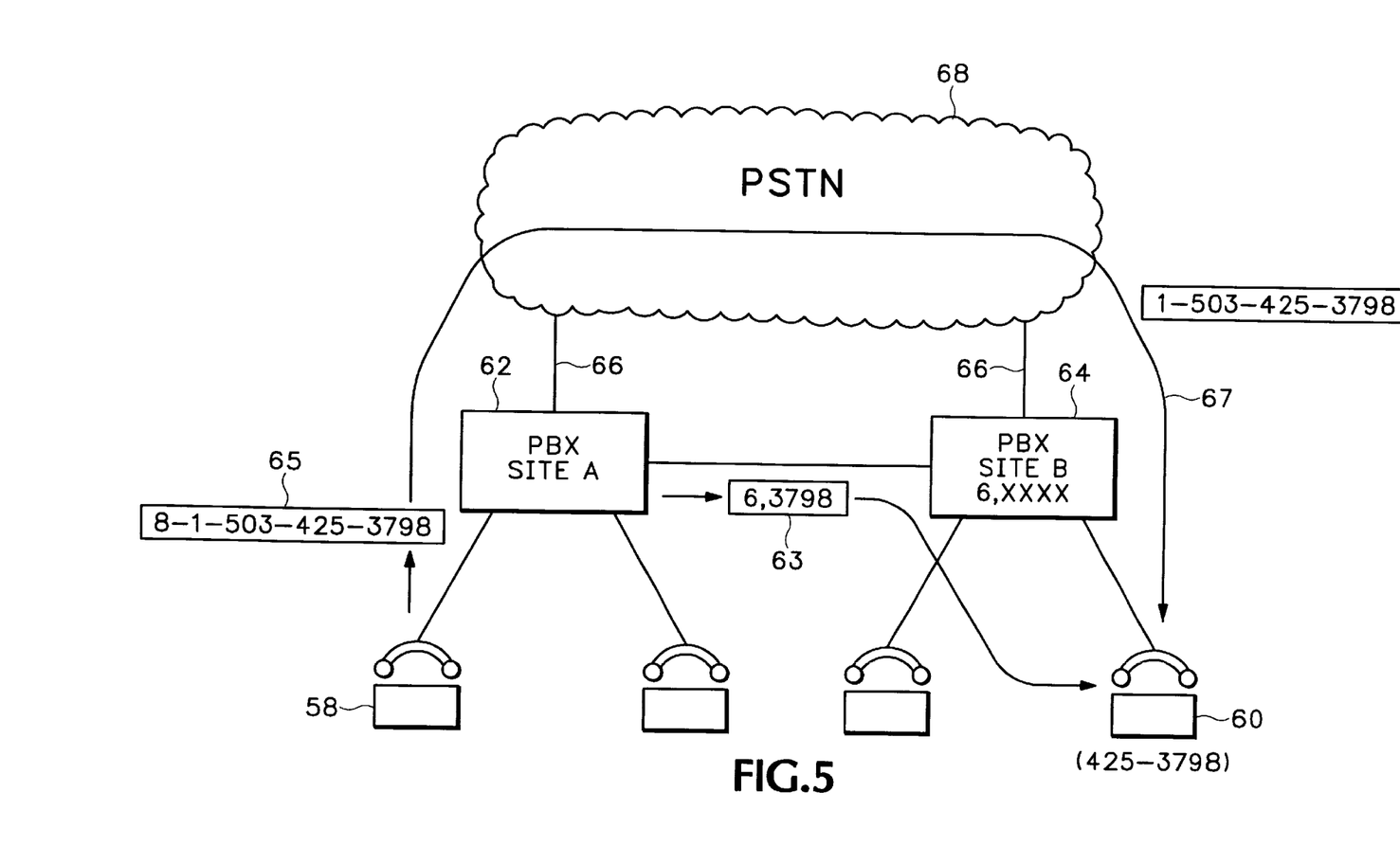
FIG. 5 shows how the dial plan mapper routes calls more efficiently in a telephony network.

FIG. 5 shows one aspect of how the dial plan mapper uses regular expression matching and number appending to improve performance of a telephone system. A phone 58 is connected to a PBX 62 at site A and a telephone 60 is connected to a PBX 64 at site B. PBX 62 and 64 are connected to outside local and long distance lines 66 that connect to PSTN 68. In existing PBX, the PBX 62 tries to route calls from phone 58 on every single digit. For example, PBX 62 connects any call having an input dial string 65 beginning with the digit "8" to an outside long distance line. PBX 62 routes all calls beginning with the digit "9" to a local outside line. The PBX 62 routes these calls 65 to outside lines 66 regardless of the digits that follow. The following digits may include a 3-digit area code and/or 7-digit "local" dialing numbers (3-digit "exchange"; 4-digit extension). Because each digit is processed one-by-one, the PBX 62 cannot independently determine the most efficient way to route the call.

For example, a call might be made from phone 58 to phone 60 within the same internal PBX system. In order for a call to be routed by PBX 62 and PBX 64 to phone 60, the digit "6" must be initially entered followed by the 4-digit extension for phone 60 (i.e., 3798). If the digit "6" is not entered first, the PBX 62 either does not route the call to phone 60 at all or ignorantly routes the call through outside lines 66 and PSTN 68. For example, a user instead of first dialing the digit "6" followed by the 4 digit extension "3798" may dial the complete area code, exchange and extension number for the phone 60 (8-1-503-425-3798). This incurs unnecessary outside line changes because the call could have been routed more cost effectively through the internal PBX system.

Current PBX systems also require the user to remember specific extension prefixes. If the user does not use the correct prefix, the call is rejected by the PBX 62. For example, the user cannot simply dial the number "425-3798" without first dialing the digit "9".

Longest regular expression matching used by the dial plan mapper 20 only processes the longest match dial string. Match patterns can be selected that match any of the dial strings "8-1-503-425-xxxx", 1-503-425-xxxx", 9-425-xxxx, and "425-xxxx" where "x" represents a "don't care". Any dial string matching one of these match patterns can then be used by the dial plan mapper 20 to generate an output dial string that causes PBX 62 to route the call internally to PBX 64. The dial plan mapper 20 would present an output dial string 63 to PBX 62 with the digit "6" prepended to the unmatched 4-digit extension "3798" from the input dial string 65. This prevents inadvertent call routing through an outside line and further prevents the user from having to remember internal company dial schemes.

Dial Plan Mapping Scheme

Figure 6:
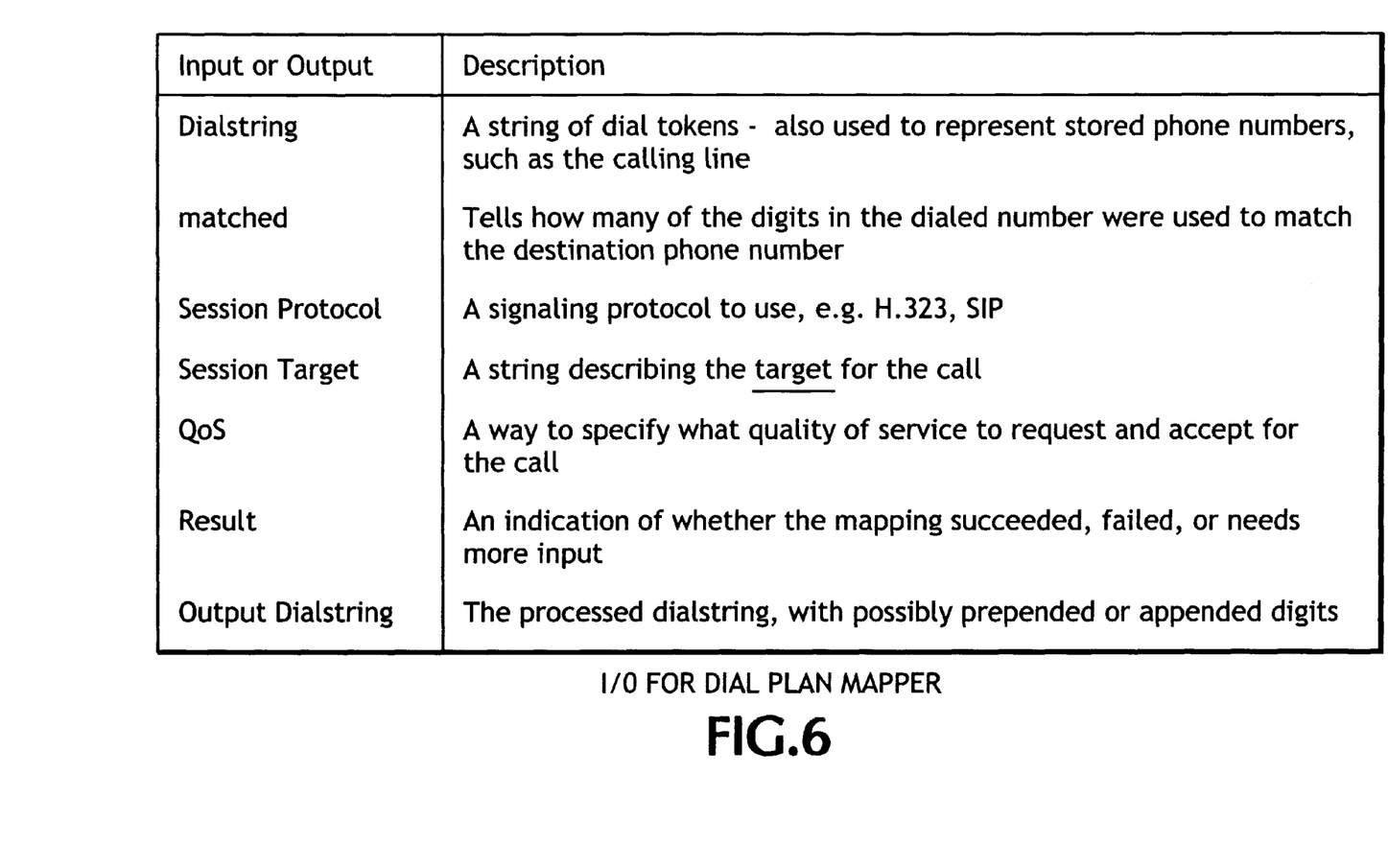
FIG. 6 shows a table of inputs and outputs for the dial plan mapper.

FIG. 6 is a table showing the different inputs and outputs of the dial plan mapper 20 shown in FIGS. 1–4.

Dialstring represents a configured phone number of the local interface requesting the mapping. This is needed for dial plans that select a destination or a routing based partially on where the call is coming from. Dialstring is also needed for session protocols that require a complete E.164 number to be passed, and require the number to be based on the E.164 number of the calling line.

Dialstring is either:

1. a set of tokens generated by the session application 34 to represent the digits returned by the telephone interface 36 when a user pulse-dials or hits DTMF-generating buttons, or
2. a dial string present in, or derived from, the session protocol for a call coming in over the IP network 22.

The set of allowable symbols in the Dialstring consist of the digits 0–9, the characters A-D (used by PSTN applications), the symbols * and #, and the special meta-symbols T and +. The meta-symbol T is used to indicate a timeout, and which is needed in some cases to figure out when the user has finished and is not going to dial any more digits.

One common case is when the dial plan allows both dialing a bare 0 to reach an operator, but also uses 0 as the introducer for an international number, e.g., 01-44-555-678-9942). The +indicates that the Dialstring consists of a complete, legal E.164 number as opposed to a prefix or private numbering plan. This is used to decide whether further manipulation of the number is needed before matching algorithms can be assured the input is in a "canonical" form.

Matched tells the session application 34 how many of the digits presented to the dial plan mapper 20 in the dial string matched a match pattern in the dial plan mapper configuration database 32. Session_Protocol indicates what call-establishment procedure to use for communicating with the call destination. Session_target indicates the destination on the IP network 22 that receives the call. QOS indicates the configured resource reservation requested and accepted for the session protocol. Result indicates success, failure or pending status of the mapping. Output dialstring is the processed dialstring output by the dial mapper with possibly prepended or appended digits.

Figure 7:
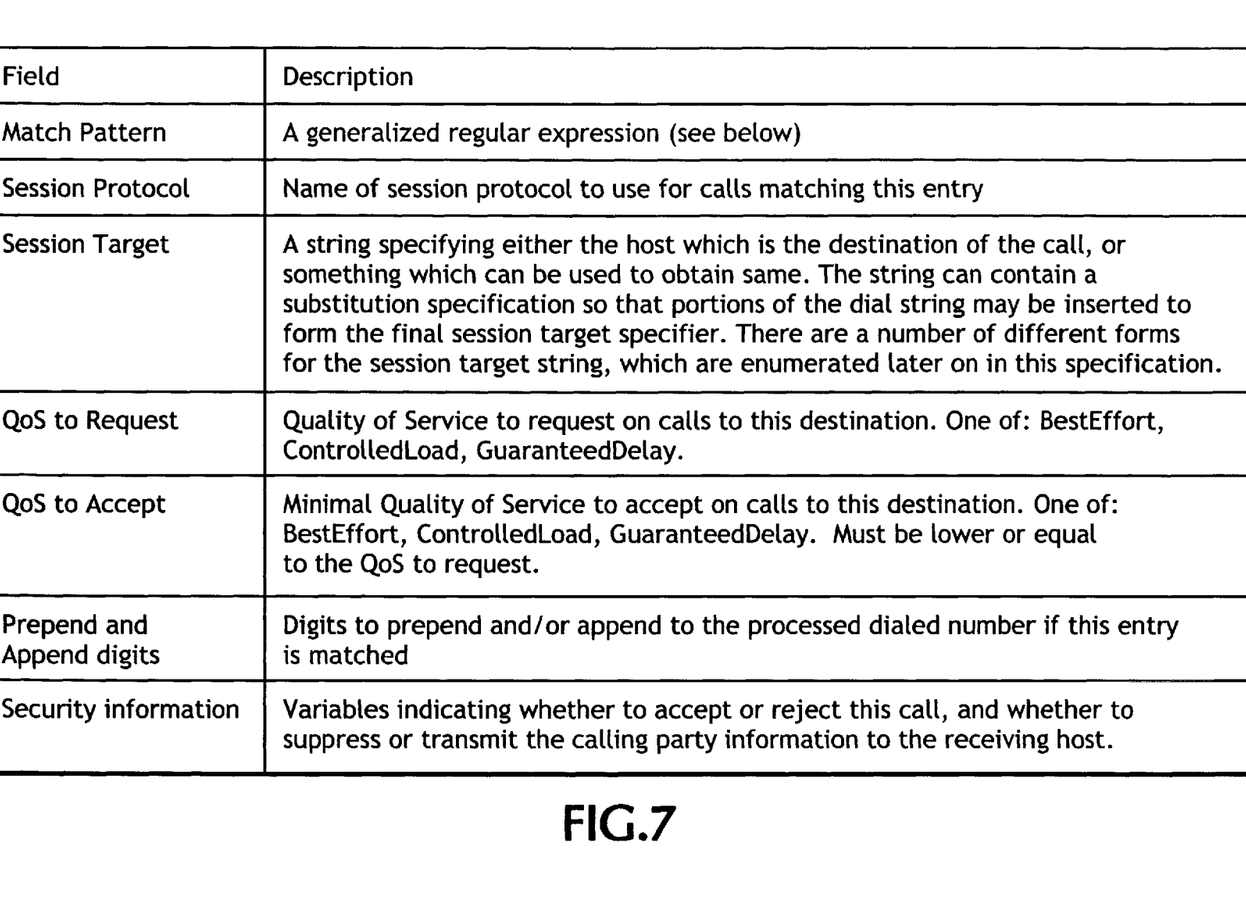
FIG. 7 shows a table of configuration information used by the dial plan mapper.

FIG. 7 shows the match patterns and other configuration information stored in database 32 (FIGS. 2A and 2B). The configuration information consists of a set of entries each containing an ordered set of fields. A Match Pattern field is a generalized regular expression and is described in further detail in FIG. 8. A Session Protocol field identifies a session protocol to use for calls matching the regular expression specified in the Match Pattern field. The Session Target field is a string specifying either a host destination of the call or a substitution specification. The substitute specification allows portions of the dial string to be inserted to form a final session target specifier. There are a number of different forms for the session target string, which are discussed below.

A QoS to Request field identifies a quality of service to request on calls to the destination. One of: BestEffort, ControlledLoad, GuaranteedDelay. A QoS Accept field specifies a minimal quality of service to accept on calls to the destination and must be lower or equal to the QoS to Request. One of: BestEffort, ControlledLoad, Guaranteed-Delay.

A Prepend and Append Digits field specifies digits to prepend and/or append to the processed dial string output by the dial plan mapper if the associated Match Pattern is matched. A Security Information field specifies whether to accept or reject the call, and whether to suppress or transit the calling party information to the receiving host.

Match Pattern

Figure 8:
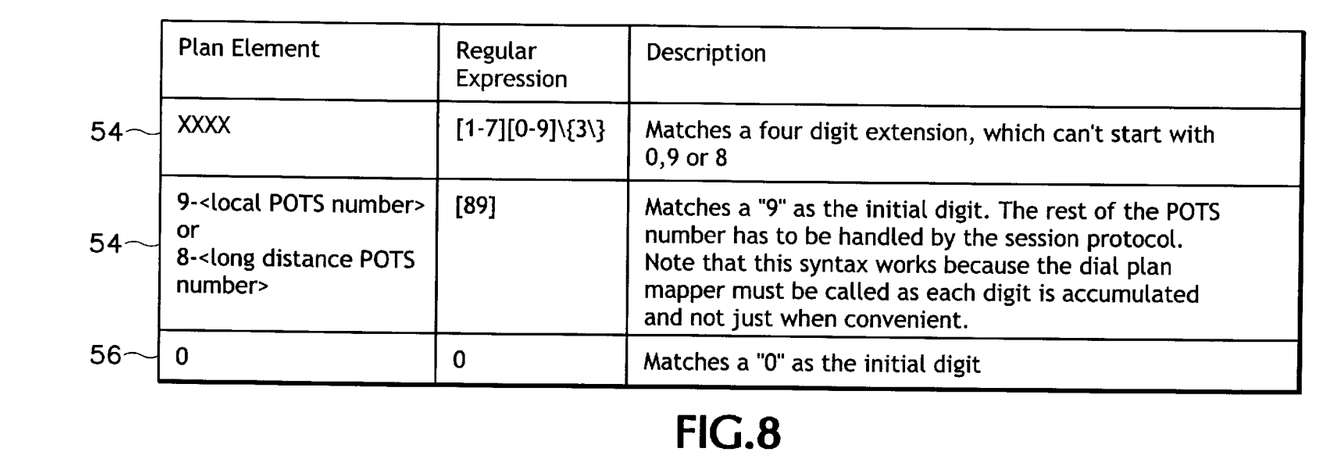
FIG. 8 shows examples of a regular expression syntax used for match patterns in the configuration information.

FIG. 8 shows examples of regular expression match patterns that may exist in the Match Pattern field for a simple dial. For this example, assume the lexical ordering of the entries defines the precedence. The first match pattern 54 matches a four digit extension that does not start with 0, 9 or 8. This would match a dial string for a local extension call in a PBX system. The next match pattern 56 matches a 9 or 8 as the initial digit in the dial string. Because the are no more expression specified in the match pattern 56, the rest of the POTS number is handled by the session protocol. Note that this syntax works because the dial plan mapper 20 is called as each digit is accumulated and not simply when convenient. The third match pattern 56 matches a "0" as the initial digit.

The set of entries is ordered so that only the configuration information associated with the longest match is returned when the dial plan mapper is invoked. Existing systems use either exhaustive tables or ad hoc rules that require either extensive custom programming or massively large tables. Using regular expression longest match allows for compact dial plan configurations, more efficient matching, and more flexible configuration of alternative destinations.

The expression syntax used in dial plan mapping configuration entries is similar to that used by the Unix grep program. While the grep syntax is more expressive than needed to match dialing tokens, it is well understood and widely used. The dial plan mapper could use any of a number of other regular expression syntax's.

Session Protocol

Figure 9:
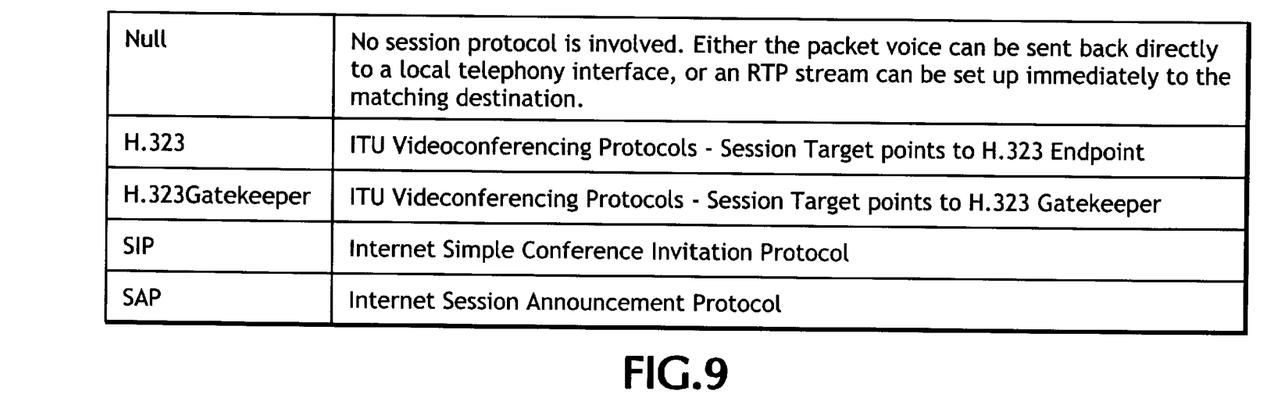
FIG. 9 shows examples of session protocols that may be contained in the configuration information associated with a match pattern.

FIG. 9 shows examples of entries in the Session Protocol field. The entries indicate what session protocol to use for reaching the destination matching the Match Pattern field. The Session Protocol may also be specified as Null when no session protocol is involved. The null value may be used when received voice packets are sent back to the local IP local telephony interface 38 (FIGS. 2A and 2B) or when a Real-Time Transport Protocol (RTP) stream is set up immediately to the matching destination.

Session Targets

Each local configuration entry in database 32 (FIGS. 2A and 2B) contains a string specifying how the dial plan mapper 20 should go about obtaining the destination information about the target needed by the session protocol. There are a variety of ways to specify a session target, reflecting the need for both very simple mapping of phone numbers to IP hosts to more complex schemes involving network-wide configuration information, dial plan servers, etc.

Another important feature of the invention is the ability to express a wide variety of destination types using the same syntax and configuration information structure. The basic syntax for the Session Target string looks like:

mapping-type:type-specific-syntax

Figure 10:
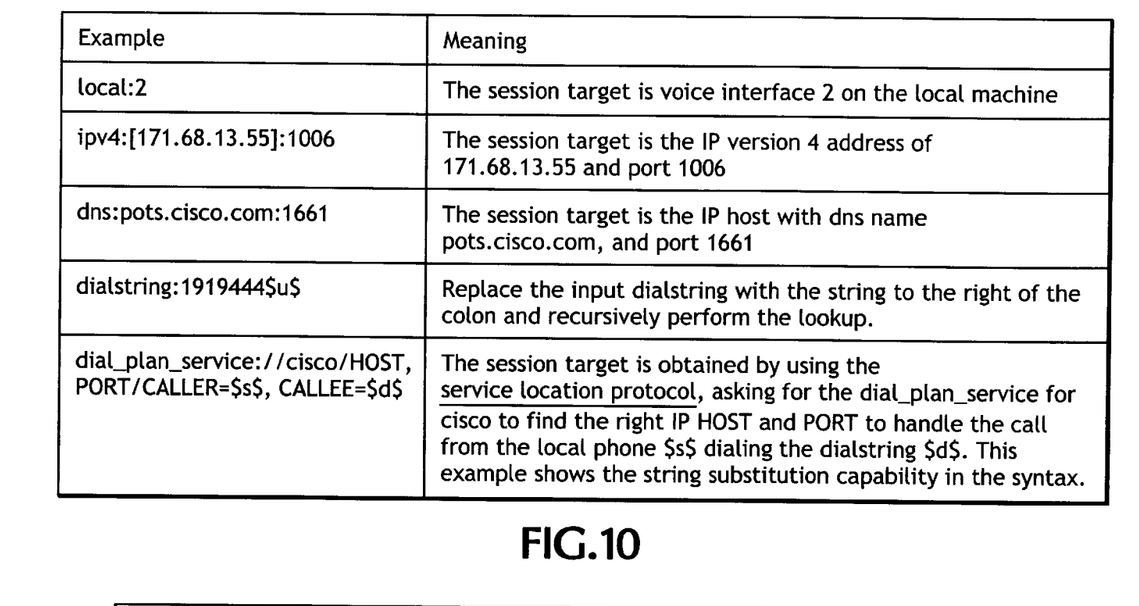
FIG. 10 shows examples of session targets that may be contained in the configuration information associated with a match pattern.

The mapping-type specifies a scheme for mapping the matching input dial string to a session target. The type-specific-syntax is a syntax that the particular mapping scheme can understand. Examples are shown in FIG. 10.

The Session Target string is subject to a simple string substitution procedure before being interpreted. One of three special patterns may be embedded anywhere in the Session Target string. When encountered, one of the following defined string substitutions are made. The pattern $s$ translates to the calling phone number, the pattern $d$ translates to the input dial string, and the pattern $u$ translates to the portion of the dial string remaining after the portion of the dial string matching the match pattern.

For example, the input dial string passed to the dial plan mapper 20 may be "61234." A configuration entry providing the longest match pattern contains the Session Target string dns:$d$.pots.cisco.com. The resulting output dial string after substitution processing is dns:61234.pots.cisco.com.

A local:mapping-type includes the syntax:local:line#. This mapping-type handles the special case of calls between lines on the same router where it may be possible to bypass the session protocol. In this case the matching configuration entry has NONE specified as the Session Protocol field. String substitutions are usually not performed in this mapping-type.

An ipv4:mapping-type includes the syntax:ipv4:[w.x.y.z]:port. This mapping type allows the dial plan mapper to map dial strings directly to IP <address,port> pairs without any intermediate levels of translation. This mapping-type can be used for very small installations, or pilot situations where it is worth avoiding relying on any servers, even the DNS servers.

A dns:mapping-type includes the syntax:dns:host.domain:port. This mapping type expresses a session target as an IP host as registered with the Domain Name System (DNS). On encountering this mapping type, the VoIP application is expected to extract the host.domain portion of the string, and then call the DNS gethostbyname( ) function to obtain the IP address for this host.

The number of local configuration entries needed for a dial plan is greatly reduced by using the DNS servers as repositories of mapping information. In one example, a network manager creates a DNS subdomain of a company dns domain with a domain name like "voip.somecompany.com" The following configuration entry is put in every VoIP router:

7[0-9]/{4} <any session protocol> dns:$d$.voip.somecompany.com

This means that extension 7-yyyy is associated with DNS entry "yyyy.voip.somecompany.com." Now, for each extension "yyyy", the network manager creates a DNS host alias entry named yyyy.voip.somecompany.com, and points it at the router which has the voice line corresponding to that phone number. If the digits "7-6541" were a line on router building1.acton.somecompany.com, the alias entry indicates this so the call is routed to the building1 router.

Moving an extension from one gateway to another is as simple as re-pointing the host alias entry and waiting for the DNS cache time-to-live (TTL) to expire. The network manager replicates the zone corresponding to domain "voip.somecompany.com" to as many DNS servers as needed to provide the desired performance and availability.

A dialstring: mapping-type allows recursive invocation of the dial plan mapper on a new dialstring obtained by string substitution on the input dial string. In other words, after a string substitution, the processed string is rematched with the input string.

A mailto: mapping-type includes the syntax:mailto:user@host.domain. This mapping type is used in conjunction with a voice mail, e-mail or fax mail system to indicate that the call, rather than being a real-time conversation, is to be treated as incoming e-mail, voice mail or fax.

A loopback: mapping-type includes the syntax:loopback::where. This mapping type is used to provide loopback testing. The where field specifies different loopback levels. RTP—indicates a loopback performed at the transport protocol level. Compressed—indicates a loopback performed on compressed voice as close as possible to the CODEC processing the data. Uncompressed—indicates a loopback performed on the Pulse Code Modulated (PCM) or analog voice as close to the telephony endpoint as possible. Loopback testing is described in further detail in co-pending patent application Ser. No. 09/181,952 entitled: HOP BY HOP QUALITY OF SERVICE MEASUREMENT SYSTEM filed Oct. 28, 1998 and is incorporated by reference.

Figure 11:
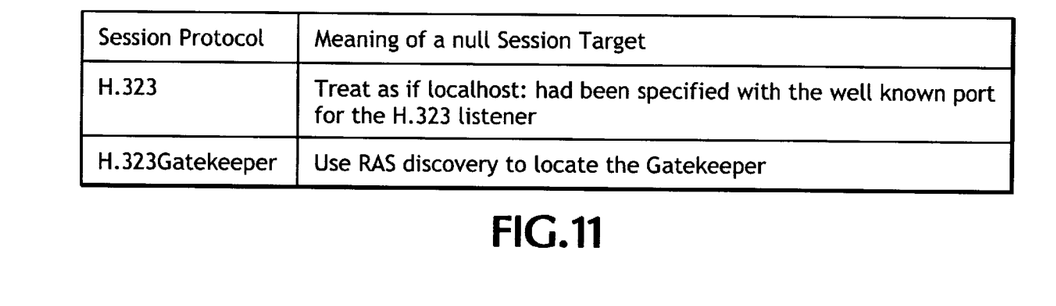
FIG. 11 shows examples of null session targets.

A Null: mapping-type usually represents a configuration error, but for certain session protocols and configurations, the session protocol can deduce the right target in the absence of any configured session target for a dial plan entry. The table in FIG. 11 enumerates the cases where a null session target has an explicitly defined meaning.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for establishing a call, comprising:

identifying a dial string;

comparing the dial string with match patterns;

identifying the match patterns matching the dial string; and generating dial plan configuration information corresponding with the identified matching match patterns.

2. A method according to claim 1 including using the configuration information to identify a host destination for communicating with a call destination.

3. A method according to claim 2 including using the configuration information to identify a session protocol indicating how to communicate with the host destination.

4. A method according to claim 1 including using the configuration information to determine how to manipulate the dial string to construct an output dial string.

5. A method according to claim 1 including identifying a mapping field in the configuration information that specifies schemes for mapping to different call destinations with different session targets.

6. A method according to claim 5 including using the mapping field for:

handling calls between endpoints on a common router;

mapping the dial string to an Internet Protocol (IP) address and associated port;

specifying the call destination as an IP host as registered with a Domain Name System;

recursively invoking new dial strings obtained by string substitution on the received dial string; or specifying loopback testing at different audio signal processing levels at the destination.

7. A method according to claim 1 including matching regular expressions in the match patterns with the dial string and identifying one of the match patterns providing a longest regular expression match.

8. A method according to claim 7 including prepending or appending additional numbers to the dial string according to the identified match pattern.

9. A call processing system, comprising:

an interface receiving an input dial string;

memory storing call configuration entries having associated call configuration information; and a processing element identifying a match pattern for one of the call configuration entries matching the input dial string and outputting a dial scheme according to the call configuration information for the identified configuration entry.

10. A system according to claim 9 wherein the processing element derives the input dial string from a telephony interface or Internet Protocol (IP) interface and outputs an output dial string according to the dial scheme.

11. A system according to claim 10 wherein the input dial string is derived from individual digits output from a phone connected to the telephony interface.

12. A system according to claim 10 wherein the input dial string is derived from IP packets sent over an IP network connected to the IP interface.

13. A system according to claim 9 wherein the processing element is located in a gateway.

14. A system according to claim 9 wherein the call configuration information identifies a session protocol for a call destination.

15. A system according to claim 9 wherein the call configuration information includes a session target that allows specification of different types of destinations and a type specific syntax understandable by the destinations specified in the session target.

16. A system according to claim 15 wherein the session target comprises a mapping string that indicates how the processing element should manipulate the input dial string to construct the output dial scheme.

17. A system according to claim 9 wherein the call configuration information specifies different levels of loopback testing.

18. A system according to claim 9 wherein the configuration information identifies a quality of service request for calls to a destination or specifies a quality of service for accepting calls from the destination.

19. A system according to claim 9 wherein the call configuration identifies security information.

20. A system according to claim 9 wherein the configuration parameters identify a Domain Name Service (DNS) session.

21. A system for establishing a call, comprising:

means for identifying a dial string;

means for comparing the dial string with match patterns;

means for identifying the match patterns matching the dial string; and means for generating dial plan configuration information corresponding with the identified matching match patterns.

22. A system according to claim 21 including means for using the configuration information to identify a host destination for communicating with a call destination.

23. A system according to claim 22 including means for using the configuration information to identify a session protocol indicating how to communicate with the host destination.

24. A system according to claim 21 including means for using the configuration information to manipulate the dial string into an output dial string.

25. A system according to claim 21 including means for identifying a mapping field in the configuration information that specifies schemes for mapping to different call destinations with different session targets.

26. A system according to claim 25 including:

means for mapping calls between endpoints on a common router;

means for mapping the dial string to an Internet Protocol (IP) address and associated port;

means for specifying the call destination as an IP host registered with a Domain Name System;

means for recursively invoking new dial strings obtained by string substitution on the received dial string; or means for specifying loopback testing at different audio signal processing levels at the destination.

27. A system according to claim 21 including means for matching regular expressions in the match patterns with the dial string and identifying one of the match patterns providing a longest regular expression match.

28. A system according to claim 27 including means for prepending or appending additional numbers to the dial string according to the identified match pattern.

29. An article comprising a machine-accessible medium having associated data that, when accessed, results in the following:

identifying a dial string;

comparing the dial string with match patterns;

identifying the match patterns matching the dial string; and generating dial plan configuration information corresponding with the identified matching match patterns.

30. The machine-accessible medium according to claim 29 including using the configuration information to identify a host destination for communicating with a call destination.

31. The machine-accessible medium according to claim 30 including using the configuration information to identify a session protocol indicating how to communicate with the host destination.

32. The machine-accessible medium according to claim 29 including using the configuration information to determine how to manipulate the dial string to construct an output dial string.

33. The machine-accessible medium according to claim 29 including identifying a mapping field in the configuration information that specifies schemes for mapping to different call destinations with different session targets.

34. The machine-accessible medium according to claim 33 including using the mapping field for:

handling calls between endpoints on a common router;

mapping the dial string to an Internet Protocol (IP) address and associated port;

specifying the call destination as an IP host as registered with a Domain Name System;

recursively invoking new dial strings obtained by string substitution on the received dial string; or specifying loopback testing at different audio signal processing levels at the destination.

35. The machine-accessible medium according to claim 29 including matching regular expressions in the match patterns with the dial string and identifying one of the match patterns providing a longest regular expression match.

36. The machine-accessible medium according to claim 35 including prepending or appending additional numbers to the dial string according to the identified match pattern.

* * * * *

UNITED STATES PATENT AND TRADEMARK OFFICE
CERTIFICATE OF CORRECTION

PATENT NO. : 6,636,594 B1
DATED : October 21, 2003
INVENTOR(S) : Oran

It is certified that error appears in the above-identified patent and that said Letters Patent is hereby corrected as shown below:

Column 3,
Line 21, "Relay (VOFR) routers," should read -- Relay (VoFR) routers, --.

Column 7,
Line 53, "Session_Protocol" should read -- Session_protocol --.

Column 8,
Line 47, "The expression syntax" should read -- The <u>expression syntax</u> --.

Column 9,
Line 58, "7[0-9]/{4}" should read -- 7[0-9]\{4\} --.

Signed and Sealed this

Twenty-seventh Day of April, 2004

JON W. DUDAS
*Acting Director of the United States Patent and Trademark Office*